US012754854B2

(12) United States Patent
Cheng et al.

(10) Patent No.: US 12,754,854 B2
(45) Date of Patent: *Oct. 6, 2026

(54) OBFUSCATING CRYPTOGRAPHIC MATERIAL IN MEMORY

(71) Applicant: Capital One Services, LLC, McLean, VA (US)

(72) Inventors: Hao Cheng, Oakton, VA (US); Rohit Joshi, Glen Allen, VA (US); Lan Xie, Chantilly, VA (US)

(73) Assignee: Capital One Services, LLC, McLean, VA (US)

( * ) Notice: Subject to any disclaimer, the term of this patent is extended or adjusted under 35 U.S.C. 154(b) by 67 days.

This patent is subject to a terminal disclaimer.

(21) Appl. No.: 18/738,346

(22) Filed: Jun. 10, 2024

(65) Prior Publication Data

US 2024/0330206 A1 Oct. 3, 2024

Related U.S. Application Data

(63) Continuation of application No. 18/159,995, filed on Jan. 26, 2023, now Pat. No. 12,032,493, which is a (Continued)

(51) Int. Cl.
*H04L 9/06* (2006.01)
*G06F 12/14* (2006.01)
(Continued)

(52) U.S. Cl.
CPC ........ *G06F 12/1408* (2013.01); *G06F 21/602* (2013.01); *H04L 9/0618* (2013.01); (Continued)

(58) Field of Classification Search
CPC ................ H04L 9/0618; H04L 9/0869; H04L 2209/08; H04L 2209/16; H04L 9/0894; (Continued)

(56) References Cited

U.S. PATENT DOCUMENTS 5,832,087 A * 11/1998 Hawthorne ........... H04L 9/0656 380/243
6,633,896 B1 * 10/2003 Moore .................. G06F 7/5324 708/623

(Continued)

*Primary Examiner* — David Garcia Cervetti
(74) *Attorney, Agent, or Firm* — Banner & Witcoff, Ltd.

(57) ABSTRACT

Methods and systems disclosed herein describe obfuscating plaintext cryptographic material stored in memory. A random location in an obfuscation buffer may be selected for each byte of the plaintext cryptographic material. The location of each byte of the plaintext cryptographic material may be stored in a position tracking buffer. To recover the scrambled plaintext cryptographic material, the location of each byte of the plaintext cryptographic material may be read from the position tracking buffer. Each byte of the plaintext cryptographic material may then be read from the obfuscation buffer and written to a temporary buffer. When each byte of the plaintext cryptographic material is recovered, the plaintext cryptographic material may be used to perform one or more cryptographic operations. The scrambling techniques described herein reduce the likelihood of a malicious user recovering plaintext cryptographic material while stored in memory.

20 Claims, 8 Drawing Sheets

Related U.S. Application Data continuation of application No. 17/108,078, filed on Dec. 1, 2020, now Pat. No. 11,604,740.

(51) Int. Cl.
*G06F 21/60* (2013.01)
*H04L 9/08* (2006.01)

(52) U.S. Cl.
CPC ........ *H04L 9/0869* (2013.01); *H04L 2209/08* (2013.01); *H04L 2209/16* (2013.01)

(58) Field of Classification Search
CPC ..... H04L 63/04; H04L 63/0861; H04L 9/002; H04L 9/0656; G06F 21/14
See application file for complete search history.

(56) References Cited

U.S. PATENT DOCUMENTS 6,785,790 B1 * 8/2004 Christie .............. G06F 12/1475 711/163
7,290,116 B1 * 10/2007 Grohoski ............ G06F 12/0864 711/E12.024
7,519,997 B2 4/2009 Shipp
7,783,046 B1 * 8/2010 Sklyarov ............... H04L 9/0894 380/46
7,848,514 B2 * 12/2010 Gebotys .................. H04L 9/003 380/42
8,060,718 B2 11/2011 Freitas et al.
8,175,264 B2 * 5/2012 Lu ........................... G09C 1/00 380/37
8,315,877 B2 11/2012 Keating et al.
8,479,014 B1 * 7/2013 Hu .......................... G06F 21/72 713/192
8,494,168 B1 * 7/2013 Tolfmans .............. G06F 21/602 380/47
8,667,301 B2 * 3/2014 Farrugia ................. G06F 21/60 717/110
8,719,588 B2 * 5/2014 Garner ................ G06F 12/1408 713/193
8,756,383 B2 6/2014 Tsirkin
8,806,439 B1 * 8/2014 Asher ..................... G06F 21/52 711/212
8,990,589 B1 * 3/2015 Kazarkin ................ G06F 21/62 713/193
9,059,838 B2 * 6/2015 Coomer ................ H04L 9/0656
9,117,094 B2 * 8/2015 Anckaert ................ G06F 21/79
9,218,467 B2 12/2015 Matthews et al.
10,013,363 B2 * 7/2018 Tucker ................ G06F 12/1408
10,581,616 B1 * 3/2020 Paruzel ................. H04L 9/3247
10,649,690 B2 5/2020 Kumar et al.
10,831,370 B1 * 11/2020 Shilane ................. G06F 3/0661
10,915,335 B1 * 2/2021 Emelianov .......... G06F 9/44521
11,281,813 B1 3/2022 Morgan et al.
11,861,051 B2 * 1/2024 Leiserson ............... G06F 21/78
2003/0065933 A1 * 4/2003 Hashimoto ........... G06F 21/126 713/194
2003/0182291 A1 9/2003 Kurupati et al.
2005/0002531 A1 1/2005 Michaelsen
2006/0274898 A1 * 12/2006 Pedlow, Jr. ........ H04N 21/4405 380/277
2007/0050642 A1 3/2007 Flynn et al.
2007/0192592 A1 8/2007 Goettfert et al.
2007/0242829 A1 * 10/2007 Pedlow, Jr. ...... H04N 21/26606 380/277
2007/0250719 A1 * 10/2007 Lai ...................... G06F 12/1441 713/190
2008/0101605 A1 5/2008 Kitamura et al.
2009/0074181 A1 * 3/2009 Pelletier ................ H04L 9/0631 380/29
2009/0113218 A1 * 4/2009 Dolgunov ............... G06F 13/28 713/190
2009/0300365 A1 12/2009 Karmes et al.
2009/0307657 A1 * 12/2009 Farrugia ............. G06F 21/6218 717/110
2009/0327709 A1 * 12/2009 Garner .................. G06F 21/123 713/162
2010/0054461 A1 * 3/2010 Ciet ...................... H04L 9/0618 380/29
2010/0073228 A1 3/2010 Smith
2010/0083050 A1 4/2010 Ohyama
2010/0106920 A1 * 4/2010 Anckaert ............ G06F 12/1408 711/E12.001
2010/0142710 A1 * 6/2010 Chrysler ............. G06F 21/6227 380/277
2010/0306854 A1 12/2010 Neergaard
2011/0004891 A1 * 1/2011 Yamaoka ........... G11B 20/0021
2011/0055592 A1 * 3/2011 Teuwen ................ G06F 21/121 713/190
2011/0219173 A1 * 9/2011 Morita .................... G06F 12/14 711/E12.091
2011/0246787 A1 * 10/2011 Farrugia .................. G09C 1/00 713/189
2012/0017028 A1 * 1/2012 Tsirkin .................... G06F 12/08 711/216
2012/0027198 A1 * 2/2012 He ............................ H04L 9/06 380/28
2012/0054719 A1 * 3/2012 Spooren .................. G06F 16/43 717/120
2012/0144208 A1 * 6/2012 Kim ........................ G06F 21/14 713/190
2012/0159043 A1 6/2012 Yeh
2012/0159186 A1 * 6/2012 Farrugia ............... H04L 9/0631 713/189
2012/0323923 A1 12/2012 Duan
2013/0036314 A1 2/2013 Glew et al.
2013/0086393 A1 * 4/2013 Pogmore ................. G06F 16/81 713/189
2013/0145177 A1 6/2013 Cordella et al.
2013/0254208 A1 9/2013 Hazel et al.
2013/0305252 A1 11/2013 Venkataraman et al.
2013/0332746 A1 * 12/2013 Monsifrot ............... G06F 21/72 713/190
2014/0019686 A1 1/2014 Dong
2014/0025858 A1 1/2014 Stark et al.
2014/0025918 A1 1/2014 Stark et al.
2014/0025919 A1 1/2014 Stark
2014/0025920 A1 1/2014 Stark et al.
2014/0040338 A1 2/2014 Van Der Sluis et al.
2014/0068109 A1 3/2014 Stark
2014/0115292 A1 4/2014 Mclachlan et al.
2014/0136814 A1 5/2014 Stark
2014/0150086 A1 * 5/2014 Horst ............... G06Q 20/38215 726/18
2014/0241099 A1 8/2014 Seo et al.
2014/0310307 A1 10/2014 Levy et al.
2015/0100753 A1 4/2015 Shen et al.
2015/0163051 A1 * 6/2015 Suzuki .................. H04L 9/0631 713/189
2015/0234751 A1 8/2015 Van Der Sluis et al.
2015/0278099 A1 10/2015 Jain et al.
2015/0280913 A1 * 10/2015 Smart ................. G06F 12/1408 713/193
2015/0363329 A1 12/2015 Precourt et al.
2016/0048457 A1 2/2016 Hars
2016/0092702 A1 3/2016 Durham et al.
2016/0103611 A1 4/2016 Westlund et al.
2016/0105363 A1 4/2016 Westlund et al.
2016/0147619 A1 * 5/2016 Borthakur ........... G06F 9/45558 713/193
2016/0154744 A1 6/2016 Zheng et al.
2016/0234053 A1 8/2016 Baek et al.
2017/0010814 A1 1/2017 Westlund et al.
2017/0061832 A1 3/2017 Ghosh et al.
2017/0126395 A1 * 5/2017 Moon ................... H04L 9/0618
2017/0185539 A1 * 6/2017 Xu .......................... G06F 21/74
2017/0353302 A1 * 12/2017 Fernandez ................ H04L 9/14
2017/0364688 A1 * 12/2017 Desai .................... G06F 21/602
2018/0011802 A1 1/2018 Ndu et al.
2018/0081825 A1 * 3/2018 Aschauer ............ G06F 12/1408

(56) References Cited

U.S. PATENT DOCUMENTS

| | | | | |
|---|---|---|---|---|
| 2018/0121181 | A1* | 5/2018 | Seo | G06F 8/30 |
| 2018/0157808 | A1* | 6/2018 | Jeon | G06F 21/125 |
| 2018/0246818 | A1* | 8/2018 | Tsirkin | G06F 9/45558 |
| 2018/0307626 | A1 | 10/2018 | Chessin | |
| 2018/0357180 | A1* | 12/2018 | Grant | G06F 12/1054 |
| 2018/0373850 | A1 | 12/2018 | Morgan et al. | |
| 2019/0138452 | A1 | 5/2019 | Avrukin et al. | |
| 2019/0182160 | A1 | 6/2019 | Bengough et al. | |
| 2019/0272239 | A1* | 9/2019 | Hagersten | G06F 12/1475 |
| 2019/0342071 | A1* | 11/2019 | Jain | H04N 21/44055 |
| 2019/0347213 | A1 | 11/2019 | Lutz et al. | |
| 2019/0361605 | A1 | 11/2019 | Kanno | |
| 2020/0004628 | A1 | 1/2020 | Ben-Rubi et al. | |
| 2020/0007332 | A1 | 1/2020 | Girkar et al. | |
| 2020/0125501 | A1* | 4/2020 | Durham | G06F 21/602 |
| 2020/0125770 | A1* | 4/2020 | LeMay | G06F 21/602 |
| 2020/0153613 | A1* | 5/2020 | Hale | G06F 7/586 |
| 2020/0159674 | A1 | 5/2020 | Morgan et al. | |
| 2020/0159676 | A1 | 5/2020 | Durham et al. | |
| 2020/0169383 | A1 | 5/2020 | Durham et al. | |
| 2020/0177562 | A1* | 6/2020 | Tav | G06F 21/62 |
| 2020/0187005 | A1 | 6/2020 | Gabriel et al. | |
| 2020/0201789 | A1 | 6/2020 | Durham et al. | |
| 2020/0210070 | A1* | 7/2020 | Durham | G06F 3/062 |
| 2020/0250318 | A1* | 8/2020 | Al Belooshi | H04L 9/0662 |
| 2020/0301764 | A1 | 9/2020 | Thoresen et al. | |
| 2020/0389304 | A1 | 12/2020 | Gryb et al. | |
| 2021/0049309 | A1 | 2/2021 | Su | |
| 2021/0055864 | A1 | 2/2021 | Noh et al. | |
| 2021/0056023 | A1 | 2/2021 | Jin et al. | |
| 2021/0152531 | A1* | 5/2021 | Pan | H04W 4/44 |
| 2021/0200857 | A1* | 7/2021 | Fry | G06F 21/52 |
| 2021/0218547 | A1* | 7/2021 | Weiler | H04L 9/0618 |
| 2021/0319142 | A1 | 10/2021 | Karkkainen et al. | |
| 2022/0011966 | A1* | 1/2022 | Keppel | G06F 3/0659 |
| 2022/0100678 | A1* | 3/2022 | Meier | G06F 12/1441 |
| 2022/0107931 | A1 | 4/2022 | Paduroiu | |
| 2022/0147251 | A1 | 5/2022 | De Mulder et al. | |
| 2022/0188426 | A1* | 6/2022 | Wolosewicz | G06F 21/602 |
| 2024/0220777 | A1* | 7/2024 | Girardi | G06N 3/0464 |
| 2025/0015985 | A1* | 1/2025 | Larson | H04L 9/3231 |

* cited by examiner

OBFUSCATING CRYPTOGRAPHIC MATERIAL IN MEMORY

REFERENCE TO RELATED APPLICATIONS

This application is a continuation of U.S. patent application Ser. No. 18/159,995, filed Jan. 26, 2023 and entitled "Obfuscating Cryptographic Material in Memory," which is a continuation of U.S. patent application Ser. No. 17/108,078 (now U.S. Pat. No. 11,604,740), filed Dec. 1, 2020 and entitled "Obfuscating Cryptographic Material in Memory," the disclosures of which are hereby incorporated by reference in their entireties.

TECHNICAL FIELD

Aspects of the disclosure generally relate to obfuscating cryptographic material in memory and more specifically to securing plaintext keys while they are stored in memory.

BACKGROUND OF THE INVENTION

Oftentimes, cryptographic material, such as passwords, encryption keys, authentication information, and the like, may be cryptographically protected (e.g., encrypted) while being stored in non-volatile memory, for example, when the cryptographic material is not being used. To use the cryptographic material, the cryptographic material may be retrieved from the non-volatile memory, decrypted, and then stored in a volatile memory (e.g., a buffer, a cache, random access memory (RAM), etc.) in plaintext (e.g., unencrypted). The cryptographic material in the volatile memory may be used to perform cryptographic operations, such as authentication, encryption, authorization, signature generation, signature verification, etc. However, the plaintext cryptographic material stored in the volatile memory represents a vulnerability. In this regard, a malicious user (e.g., hacker) may use various tools to obtain the plaintext cryptographic material stored in the volatile memory. For example, the malicious user may gain access to a host and use tools to scan the volatile memory to obtain the plaintext cryptographic material. In another example, the malicious user may scan memory dumps and/or core dump files to retrieve the plaintext cryptographic material. In yet a further example, the malicious user may perform a cold boot attack to obtain the plaintext cryptographic material. Once the plaintext cryptographic material is obtained, the system may be compromised and the malicious user may obtain confidential and/or other secret information.

SUMMARY OF THE INVENTION

The following presents a simplified summary of various features described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

The present disclosure describes techniques for obfuscating plaintext cryptographic material stored in a volatile memory to prevent malicious users from obtaining the plaintext cryptographic material via the above described attack vectors (e.g., scanning memory dumps, scanning core dump files, cold boot attacks, etc.).

To reduce the likelihood of malicious users obtaining the plaintext cryptographic material, the present application describes methods, devices, systems, and/or instructions stored on non-transitory computer-readable media for scrambling the storage location of each byte of plaintext cryptographic material. In this regard, a random location may be selected for each byte of the plaintext cryptographic material. The random location may be a location (e.g., address) in a first portion of a block of memory referred to as an obfuscation buffer. The obfuscation buffer may have random (e.g., cryptographically random) data written thereto prior to receiving each byte of the plaintext cryptographic material. The location of each byte of the plaintext cryptographic material may be stored in a second portion of the memory block referred to as a position tracking buffer. To recover the scrambled plaintext cryptographic material, the location of each byte of the plaintext cryptographic material may be read from the second portion of the memory block. The location of each byte of the plaintext cryptographic material may be read from the obfuscation buffer and written to a temporary buffer. When each byte of the plaintext cryptographic material is recovered, the plaintext cryptographic material may be used to perform one or more cryptographic operations.

By scrambling plaintext cryptographic material using the techniques described herein, the present application obfuscates plaintext cryptographic material to prevent malicious users from obtaining the plaintext cryptographic material via attack vectors, such as scanning memory dumps, scanning core dump files, cold boot attacks, and the like. These features, along with many others, are discussed in greater detail below.

BRIEF DESCRIPTION OF THE DRAWINGS

The present disclosure is described by way of example and not limited in the accompanying figures in which like reference numerals indicate similar elements and in which.

DETAILED DESCRIPTION

Figure 1:
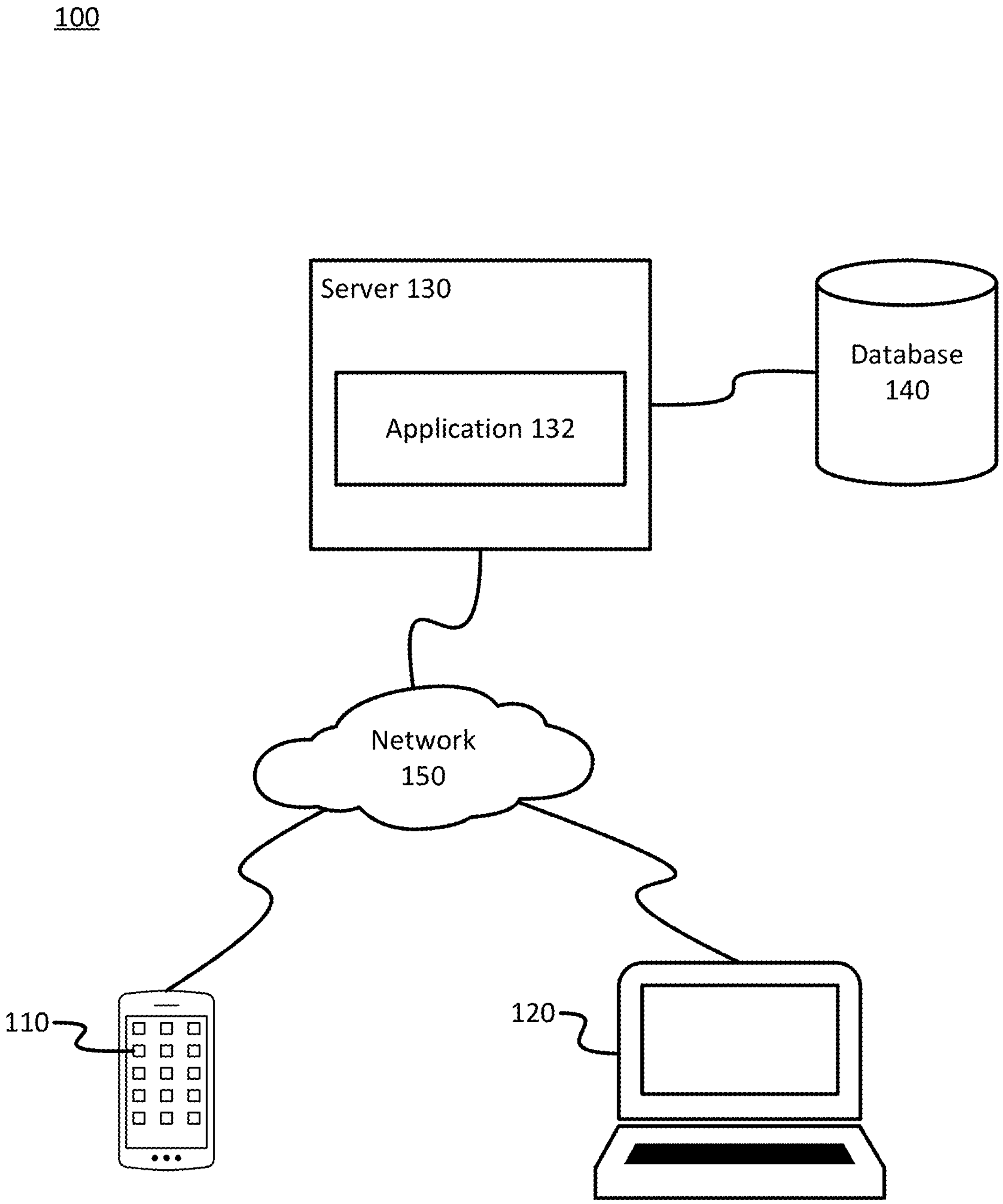
FIG. 1 shows an example of a system in which one or more features described herein may be implemented.

In the following description, reference is made to the accompanying drawings, which form a part hereof, and in which are shown various examples of features of the disclosure and/or of how the disclosure may be practiced. It is to be understood that other features may be utilized and structural and functional modifications may be made without departing from the scope of the present disclosure. The disclosure may be practiced or carried out in various ways.

In addition, it is to be understood that the phraseology and terminology used herein are for the purpose of description and should not be regarded as limiting. Rather, the phrases and terms used herein are to be given their broadest interpretation and meaning.

By way of introduction, features discussed herein may relate to methods, devices, systems, and/or instructions stored on non-transitory computer-readable media for obfuscating plaintext cryptographic material stored in memory. As noted above, malicious users (e.g., hackers) may scan memory dumps and/or core dump files, perform cold boot attacks, and perform a variety of other hacks in an attempt to obtain plaintext cryptographic material while it is temporarily stored in a memory, cache, buffer, etc.

Cryptographic material may be cryptographically protected (e.g., encrypted) while not-in-use. However, when an application and/or device requests the cryptographic material, it may be retrieved from the non-volatile memory, decrypted, and then stored in a volatile memory (e.g., a buffer, a cache, random access memory (RAM), etc.) in plaintext (e.g., unencrypted). To store the plaintext cryptographic material in accordance with the techniques described herein, a block of memory may be allocated for the plaintext cryptographic material. The block of memory may comprise a header, an obfuscation buffer, and a position tracking buffer. The header may comprise four fields, including a first field for storing a length of the plaintext cryptographic material, a second field for storing a starting position (e.g., a position start offset value) that indicates a location of a first byte of the plaintext cryptographic material in the obfuscation buffer, a third field for storing a checksum of the plaintext cryptographic material, and a fourth field for storing a size of the obfuscation buffer. After allocating the block of memory, information related to the plaintext cryptographic material may be stored in each of the header fields. In some instances, the header information may be encoded to further obfuscate the information contained in each of the header fields. Next, first random data may be written to the obfuscation buffer and second random data may be written to the position tracking buffer. After random data is written to the obfuscation buffer and the position tracking buffer, a random value is selected for the first byte of the plaintext cryptographic material. The random value may indicate the location with which the first byte of the plaintext cryptographic material is written to in the obfuscation buffer. The location of the first byte of the plaintext cryptographic material in the obfuscation buffer may then be written to an address in the position tracking buffer determined by the position start offset value. A random location in the obfuscation buffer may be determined for each subsequent byte of the plaintext cryptographic material. The location of each subsequent byte may be stored in the position tracking buffer in the bytes following the address indicating the location of the first byte of the plaintext cryptographic material. Once every byte of the plaintext cryptographic material is written to the obfuscation buffer, the plaintext cryptographic material may be erased from the temporary buffer. The temporary buffer may then be overwritten with data to clear remnants of the plaintext cryptographic material, thereby making the plaintext cryptographic material unrecoverable from the temporary buffer.

To recover the cryptographic material, the header may be decoded to obtain the position start offset value. The location of the first byte of the plaintext cryptographic material may be read from an address in the position tracking buffer determined based on the position start offset value. After obtaining the address, the first byte of the plaintext cryptographic material may be written, from its location in the obfuscation buffer, to the temporary buffer. The location of each subsequent byte of the plaintext cryptographic material may be determined by reading the location of the byte from the position tracking buffer and writing the byte of plaintext cryptographic material to the temporary buffer. Once the plaintext cryptographic material is recovered from the obfuscation buffer, the plaintext cryptographic material may be used to perform cryptographic operations, such as authentication, encryption, authorization, etc.

The obfuscation techniques described herein may prevent malicious users from obtaining the plaintext cryptographic material via attack vectors, such as scanning memory dumps, scanning core dump files, cold boot attacks, and the like, without adding significant overhead (e.g., time and/or processing resources) to the system's overall operations.

FIG. 1 shows an example of a system 100 that includes a first user device 110, a second user device 120, and a server 130, connected to a first database 140, interconnected via network 150.

First user device 110 may be a mobile device, such as a cellular phone, a mobile phone, a smart phone, a tablet, a laptop, or an equivalent thereof. First user device 110 may provide a first user with access to various applications and services. For example, first user device 110 may provide the first user with access to the Internet. Additionally, first user device 110 may provide the first user with one or more applications ("apps") located thereon. The one or more applications may provide the first user with a plurality of tools and access to a variety of services.

Second user device 120 may be a computing device configured to allow a user to execute software for a variety of purposes. Second user device 120 may belong to the first user that accesses first user device 110, or, alternatively, second user device 120 may belong to a second user, different from the first user. Second user device 120 may be a desktop computer, laptop computer, or, alternatively, a virtual computer. The software of second user device 120 may include one or more web browsers that provide access to websites on the Internet.

Server 130 may be any server capable of executing application 132. Additionally, server 130 may be communicatively coupled to first database 140. In this regard, server 130 may be a stand-alone server, a corporate server, or a server located in a server farm or cloud-computer environment. According to some examples, server 130 may be a virtual server hosted on hardware capable of supporting a plurality of virtual servers.

Application 132 may be server-based software configured to provide users with access data and/or information. Application 132 may be the server-based software that corresponds to the client-based software executing on first user device 110 and second user device 120. In some examples, application 132 may be a banking application that provides users access to their account information through an application or a website accessed by first user device 110 or second user device 120 via network 150.

First database 140 may be configured to store information on behalf of application 132. The information may include, but is not limited to, personal information, account information, and user-preferences. Personal information may include a user's name, address, phone number (i.e., mobile number, home number, business number, etc.), social security number, username, password, employment information, family information, and any other information that may be used to identify the first user. Account information may include account balances, bill pay information, direct deposit information, wire transfer information, statements, and the like. User-preferences may define how users receive notifications and alerts, spending notifications, and the like. First database 140 may include, but are not limited to relational databases, hierarchical databases, distributed databases, in-memory databases, flat file databases, XML databases, NoSQL databases, graph databases, and/or a combination thereof.

First network 150 may include any type of network. In this regard, first network 150 may include the Internet, a local area network (LAN), a wide area network (WAN), a wireless telecommunications network, and/or any other communication network or combination thereof. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. The data transferred to and from various computing devices in system 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in system 100 in front of one or more computing devices such that any external devices may communicate directly with the specialized hardware.

Figure 2:
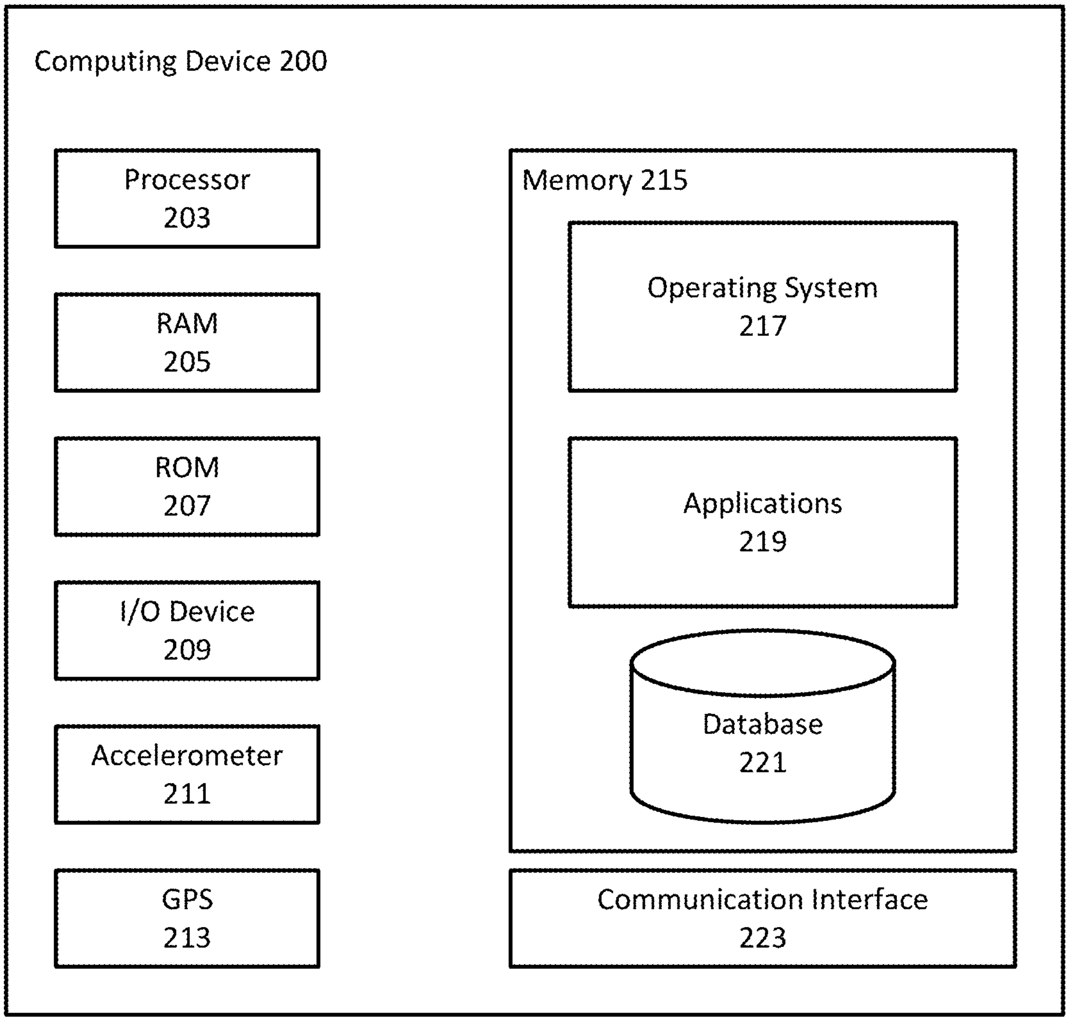
FIG. 2 shows an example computing device.

Any of the devices and systems described herein may be implemented, in whole or in part, using one or more computing devices described with respect to FIG. 2. Turning now to FIG. 2, a computing device 200 that may be used with one or more of the computational systems is described. The computing device 200 may comprise a processor 203 for controlling overall operation of the computing device 200 and its associated components, including RAM 205, ROM 207, input/output device 209, accelerometer 211, global-position system antenna 213, memory 215, and/or communication interface 223. A bus may interconnect processor(s) 203, RAM 205, ROM 207, memory 215, I/O device 209, accelerometer 211, global-position system receiver/antenna 213, memory 215, and/or communication interface 223. Computing device 200 may represent, be incorporated in, and/or comprise various devices such as a desktop computer, a computer server, a gateway, a mobile device, such as a laptop computer, a tablet computer, a smart phone, any other types of mobile computing devices, and the like, and/or any other type of data processing device.

Input/output (I/O) device 209 may comprise a microphone, keypad, touch screen, and/or stylus through which a user of the computing device 200 may provide input, and may also comprise one or more of a speaker for providing audio output and a video display device for providing textual, audiovisual, and/or graphical output. Software may be stored within memory 215 to provide instructions to processor 203 allowing computing device 200 to perform various actions. For example, memory 215 may store software used by the computing device 200, such as an operating system 217, application programs 219, and/or an associated internal database 221. The various hardware memory units in memory 215 may comprise volatile and nonvolatile, removable and non-removable media implemented in any method or technology for storage of information such as computer-readable instructions, data structures, program modules, or other data. Memory 215 may comprise one or more physical persistent memory devices and/or one or more non-persistent memory devices. Memory 215 may comprise random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Accelerometer 211 may be a sensor configured to measure accelerating forces of computing device 200. Accelerometer 211 may be an electromechanical device. Accelerometer may be used to measure the tilting motion and/or orientation computing device 200, movement of computing device 200, and/or vibrations of computing device 200. The acceleration forces may be transmitted to the processor to process the acceleration forces and determine the state of computing device 200.

GPS receiver/antenna 213 may be configured to receive one or more signals from one or more global positioning satellites to determine a geographic location of computing device 200. The geographic location provided by GPS receiver/antenna 213 may be used for navigation, tracking, and positioning applications. In this regard, the geographic may also include places and routes frequented by the first user.

Communication interface 223 may comprise one or more transceivers, digital signal processors, and/or additional circuitry and software, protocol stack, and/or network stack for communicating via any network, wired or wireless, using any protocol as described herein.

Processor 203 may comprise a single central processing unit (CPU), which may be a single-core or multi-core processor, or may comprise multiple CPUs. Processor(s) 203 and associated components may allow the computing device 200 to execute a series of computer-readable instructions (e.g., instructions stored in RAM 205, ROM 207, memory 215, and/or other memory of computing device 215, and/or in other memory) to perform some or all of the processes described herein. Although not shown in FIG. 2, various elements within memory 215 or other components in computing device 200, may comprise one or more caches, for example, CPU caches used by the processor 203, page caches used by the operating system 217, disk caches of a hard drive, and/or database caches used to cache content from database 221. A CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For example, in a multi-tiered application, a database cache on an application server may reduce data retrieval and data manipulation time by not needing to communicate over a network with a back-end database server. These types of caches and others may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the disclosure.

Figure 3A:
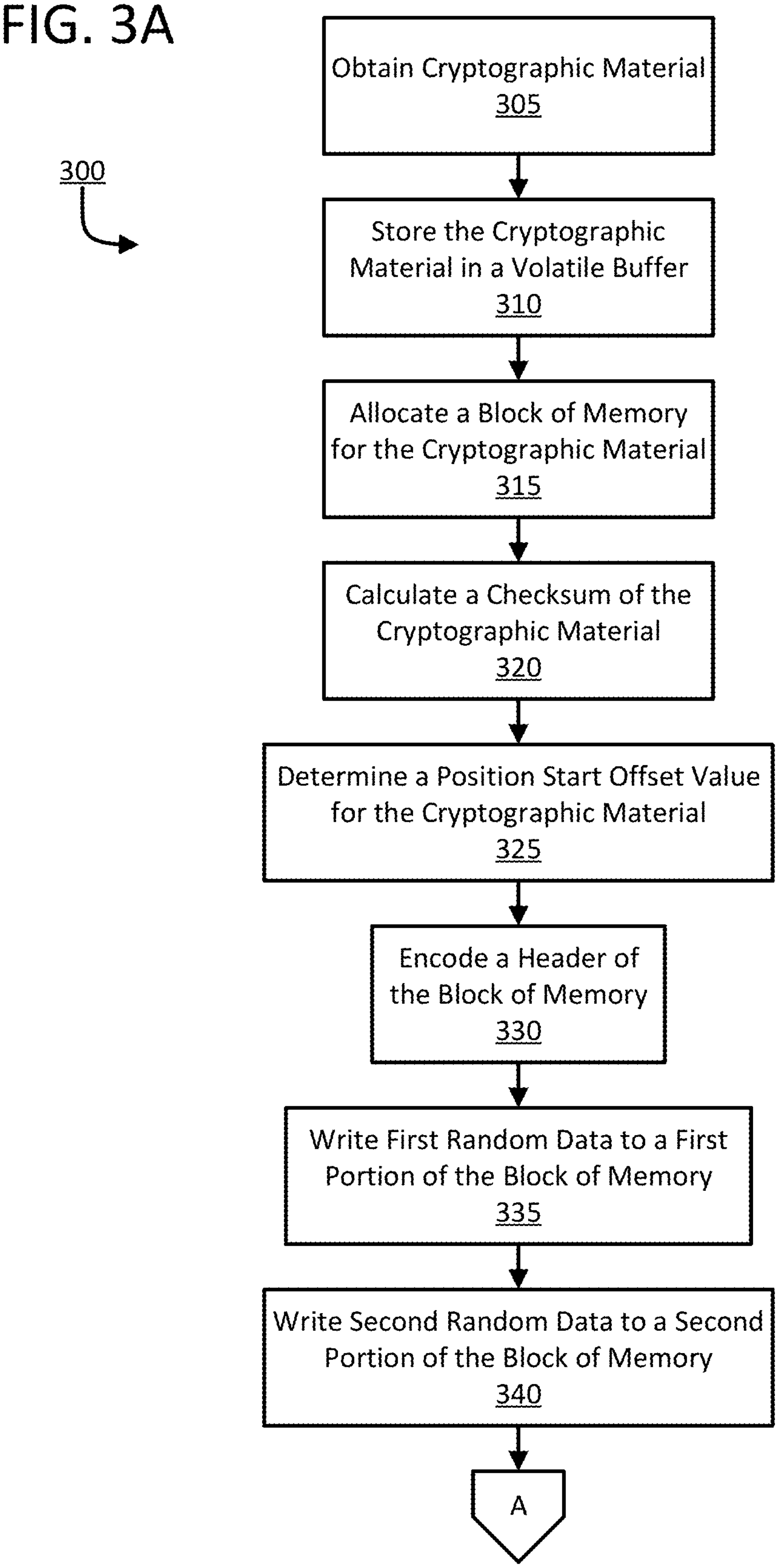
FIGS. 3A and 3B show an example of a process for obfuscating cryptographic material stored in a memory according to one or more aspects of the disclosure.
Figure 3B:
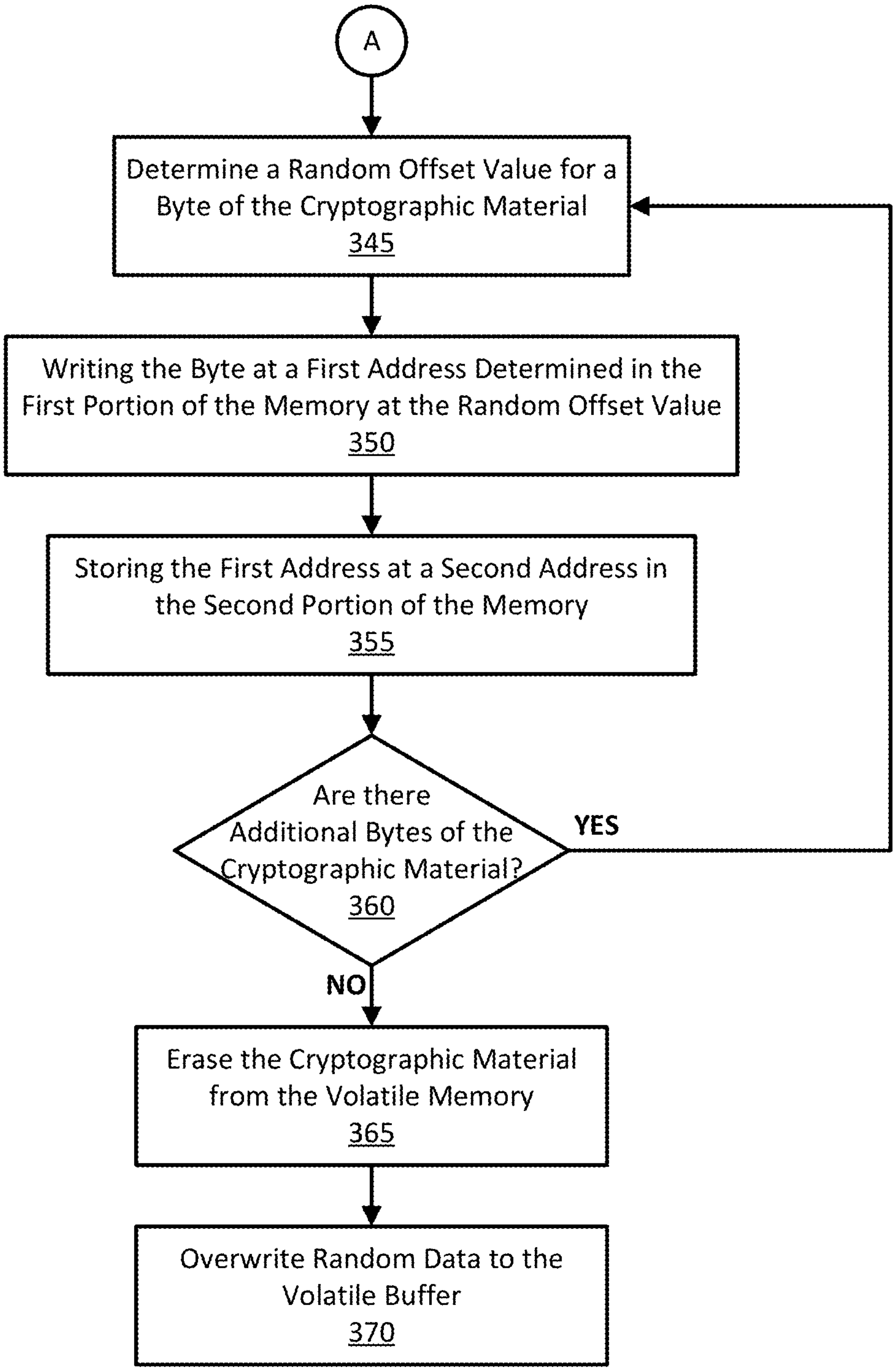

Cryptographic material, such as passwords, encryption keys, authentication information, etc., may be encrypted and stored in a non-volatile memory when the cryptographic material is not being used. When the cryptographic material is used, the cryptographic material may be retrieved from the non-volatile memory, decrypted, and then stored, in plaintext, in a volatile memory, such as a buffer, a cache, RAM. To obfuscate the plaintext cryptographic material in the volatile memory, each byte of the plaintext cryptographic material may be stored in a random location to make it more difficult for the plaintext cryptographic material to be recovered via a memory dump, a core dump file, a cold boot attack, or an equivalent thereof. FIGS. 3A and 3B show a flow chart of a process 300 for obfuscating cryptographic material stored in a memory according to one or more aspects of the disclosure. Some or all of the steps of process 300 may be performed using one or more computing devices as described herein, including, for example, a client device, a server, or a memory comprising a processor configured to performed the methods described herein.

In step 305, a computing device (e.g., an application executing on a computing device) may obtain data that is to be stored in a memory. The data may comprise cryptographic material, such as a password, an encryption key, authentication information, a biometric identifier, and the like. The data may be requested from a server, a third-party, and/or a data repository (e.g., database). In response, the data may be received in a response from the server, the third party, and/or the data repository. In step 310, the data may be stored in a volatile buffer. In some examples, the data may be encrypted. Accordingly, the data may be decrypted prior to being stored in the volatile buffer.

In step 315, the computing device (e.g., the application executing on the computing device) may allocate a block of the memory for the data. The block of memory ("memory block") may be a contiguous chunk or segment of memory space. The block of memory may comprise three areas: a header, an obfuscation buffer, and/or a position tracking buffer. As will be described in greater detail below, the header may store information related to the data ("metadata"), the obfuscation buffer may store bytes of the data at random locations throughout the obfuscation buffer, and the position tracking buffer may store the location of each of the random locations. When allocating the block of memory, the computing device may allocate n-bytes for the obfuscation buffer and 2*n-bytes for the position tracking buffer.

The header may comprise four fields. Each of the four fields may be 4-bytes. The first field may store a length of the data; the second field may store a position start offset (e.g. position start offset value) that indicates a location of a first byte of the data in the obfuscation buffer; a third field may store a checksum of the data; and a fourth field may store a size of the obfuscation buffer. The size (e.g., length) of the data (e.g., plaintext cryptographic material) may be stored in the first field of the header. The size (e.g., length) of the data may be represented by 2-bytes of the 4-bytes allocated to the first field. In this regard, the system may encode the first field and/or header to obfuscate the header information. The number of bytes allocated for the obfuscation buffer may be stored in the fourth field of the header.

In step 320, the computing device (e.g., the application executing on the computing device) may calculate a checksum of the data. The checksum may be used to verify the integrity of the data when the data is retrieved and/or re-assembled from the obfuscation buffer. In this regard, the checksum may be calculated using a cyclic redundancy check (e.g., CRC16). Additionally or alternatively, the checksum may be calculated using a hash function to obtain a value of a fixed length that can be used to verify the integrity of the data. Once the checksum has been calculated, the checksum may be stored in the third field of the header.

In step 325, the computing device (e.g., the application executing on the computing device) may determine a position start offset value. The position start offset value may be a first location in the position tracking buffer that stores an address of the first byte of the data. The position start offset value may be determined randomly.

Once the pertinent information corresponding to each field of the header has been stored therein, the computing device (e.g., the application executing on the computing device) may encode the header to obfuscate the data and/or information contained therein, in step 330. That is, each piece of information stored in the header may use less than the entirety of the available space. As noted above, the size (e.g., length) of the data may consume two of the four bytes allocated in a field. The unused space may be filled with zeroes or ones ("padding data"). In the case of a core memory dump, the repetitive numbers may signal a pattern and/or relevant information to a malicious user (e.g., hacker). To mitigate against a malicious user recognizing the header, the header fields may be further encoded. That is, the padding data may be replaced with random data to prevent a malicious user from recognizing the header fields. Once the header information is secured, steps can be taken to secure the data (e.g., the plaintext cryptographic material) in the memory block.

In step 335, the computing device (e.g., the application executing on the computing device) may write first random data to the obfuscation buffer. The first random data may be generated using a pseudorandom number generator. Additionally or alternatively, the first random data may be read from a file (e.g., /dev/random, /dev/urandom, /dev/arandom/, etc.) that stores environmental noise collected from one or more components of the computing device. In step 340, the computing device (e.g., the application executing on the computing device) may write second random data to the position tracking buffer portion of the block of memory. Like the first random data, the second random data may be generated by a pseudorandom number generator or read from a file (e.g., /dev/random, /dev/urandom, /dev/arandom/, etc.). The second random data may be read from the same file as the first random data. Alternatively, the first random data and the second random data may be read from different files. In some instances, the first random data may be generated using a pseudorandom number generator, while the second random data may be read from the file. It will be appreciated that any combination of the techniques described above may be used to populate the obfuscation buffer portion of the memory block and the position tracking buffer portion of the memory block with random data.

Once the obfuscation buffer and the position tracking buffer are filled with random data, the computing device (e.g., the application executing on the computing device) may determine a random offset value for a byte of the data to be written to the obfuscation buffer in step 345. In step 350, the computing device (e.g., the application executing on the computing device) may write a first byte of the data to the obfuscation buffer at a location (e.g., address) indicated by a first random offset value. In step 355, the computing device (e.g., the application executing on the computing device) may store the location of the first byte of the data at a first address in the position tracking buffer. The first address may be determined based on the position start offset value and an index number indicating which byte of the data was written to the obfuscation buffer. For example, the first byte of data may have an index value of zero ("0"). The location of the first byte of data in the obfuscation buffer may be written to an address in the position tracking buffer determined by the position offset value and the index value (e.g., 0 for the first byte).

In step 360, the computing device (e.g., the application executing on the computing device) may determine whether there are any more bytes of the data (e.g., plaintext cryptographic material). If there are additional bytes, process 300 returns to step 345, where the computing device (e.g., the application executing on the computing device) may determine a random offset value for the next byte of the data. After determining the random offset value for the next byte of the data, the computing device (e.g., the application executing on the computing device) may determine whether the random offset value has been used for an earlier byte of data. If the random offset value has been used previously, the computing device may determine a new random offset value. This may be repeated until the computing device determines a random offset value that has not been previously used. The computing device (e.g., the application executing on the computing device) may write the next byte of data to the obfuscation buffer at a second location (e.g., address) indicated by a second random offset value. The second location (e.g., address) may be stored in the position tracking buffer at a second address. As discussed above, the location of the next byte of data in the obfuscation buffer may be written to an address in the position tracking buffer determined by the position offset value and the index value (e.g., "1" for the second byte, "2" for the third byte, . . . , "n−1" for the $n^{th}$ byte). In this way, the location of each byte of the data may be written in a consecutive string of bytes in the position tracking buffer. When the are no more bytes of the data, process 300 proceeds to step 365.

In step 365, the computing device (e.g., the application executing on the computing device) may erase the data (e.g., plaintext cryptographic material) from the volatile buffer. That is, each byte of the data (e.g., plaintext cryptographic material) may be deleted from the volatile buffer after a determination that each byte of the data (e.g., plaintext cryptographic material) has been written to the obfuscation buffer. In step 370, the computing device (e.g., the application executing on the computing device) may overwrite third random data to the volatile buffer to render the data (e.g., the plaintext cryptographic material) unrecoverable. In some instances, steps 365 and 370 may be combined in a technique known as "zeroization." In zeroization, sensitive data, such as plaintext cryptographic material, may be erased (e.g., deleted) from memory. The contents of the memory may then be altered and/or overwritten to prevent the recovery of the sensitive data from the memory.

The obfuscation techniques described above may be performed each time sensitive plaintext data is stored in memory. It will be appreciated that sensitive plaintext data that has not been used within a predetermined amount of time may be periodically removed (e.g., deleted or erased), for example, to allocate space for new, plaintext data. In this regard, process 300 may be performed each time data is written to the memory.

The techniques described herein may prevent hackers from obtaining data, such as plaintext cryptographic material, stored in volatile memory. In particular, the obfuscation techniques described herein prevent recovery of the data by scanning memory dumps, scanning core dump files, cold boot attacks, and the like. Furthermore, the obfuscation techniques provide additional security without adding significant overhead to the system's overall operations. That is, the obfuscation techniques described herein do not cause a significant delay when the data (e.g., the cryptographic material) is recovered from the memory to be used, for example, to encrypt/decrypt data.

Figure 4:
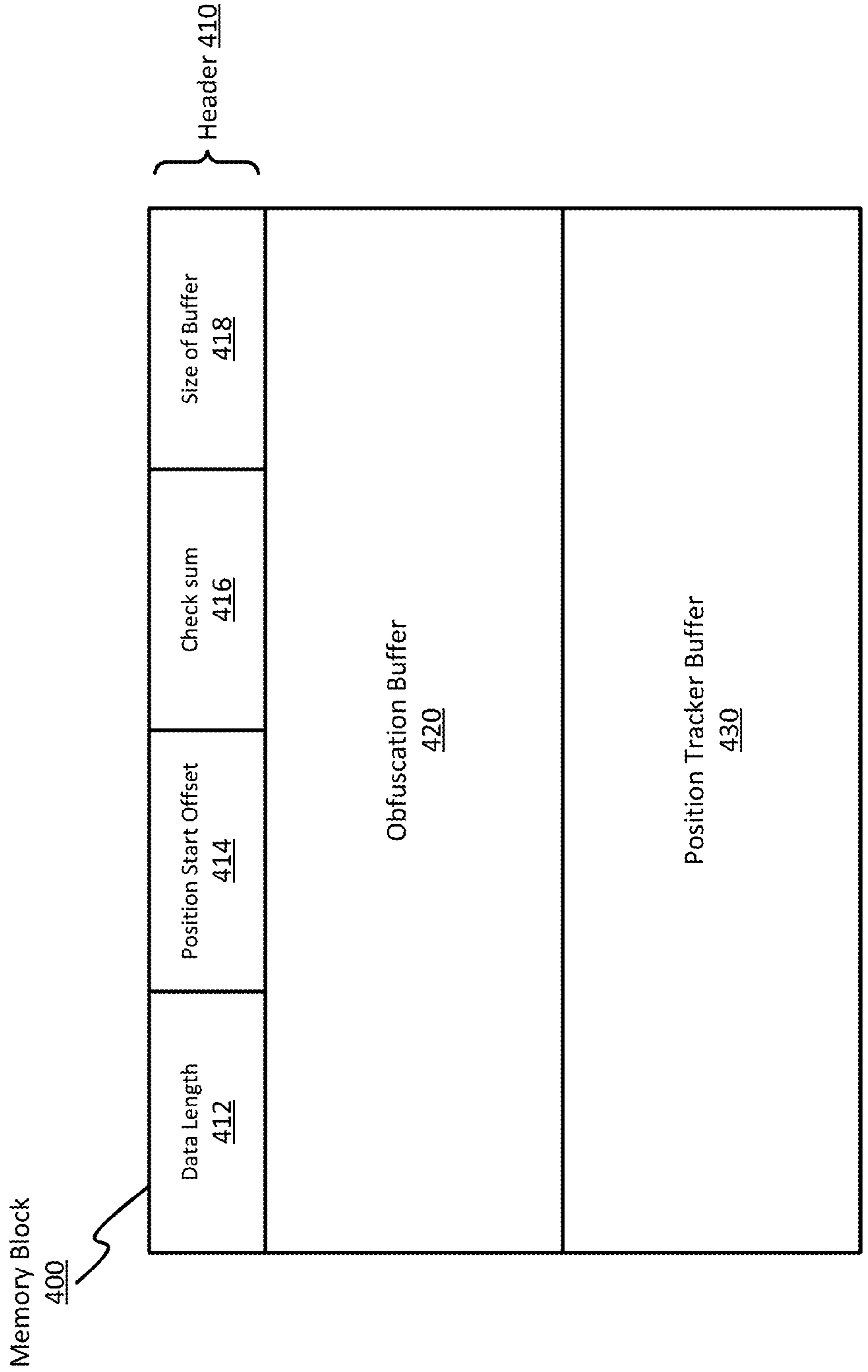
FIG. 4 shows an example of a block of memory for storing cryptographic material in accordance with one or more aspects of the disclosure.

FIG. 4 shows an example of a memory block 400 for storing cryptographic material in accordance with one or more aspects of the disclosure. As noted above, the memory block 400 may be a contiguous chunk of memory, for example, in a volatile memory, such as a cache, a buffer, RAM, etc. Memory block 400 may comprise header 410, obfuscation buffer 420, and position tracking buffer 430.

Header 410 may comprise a first field 412, a second field 414, a third field 416, and a fourth field 418. Header 410 may be 16-bytes, and first field 412, second field 414, third field 416, and fourth field 418 may be 4-bytes each. As noted above, first field 412 may store a length of the data (e.g., the plaintext cryptographic material); second field 414 may store a position start offset value; third field 416 may store a checksum of the data; and fourth field 418 may store a size of obfuscation buffer 420.

Obfuscation buffer 420 may comprise a memory space configured to store each byte of the data (e.g., the plaintext cryptographic material) at random locations throughout the memory space. Obfuscation buffer 420 may comprise n-bytes, where n is a number between 2048 and 32,000. As noted above, random data may be written to obfuscation buffer 420, for example, prior to each byte of the data (e.g., the plaintext cryptographic material) being written to the obfuscation buffer. In this regard, each byte of the data (e.g., the plaintext cryptographic material) may overwrite a random byte of data.

Position tracking buffer 430 may comprise a memory space configured to store the location of each byte of the data in the obfuscation buffer. Position tracking buffer 430 may comprise 2*n-bytes. Like obfuscation buffer 420, random data may be written to position tracking buffer 430, for example, prior to the location of each byte of the data being written to the position tracking buffer.

Figure 5:
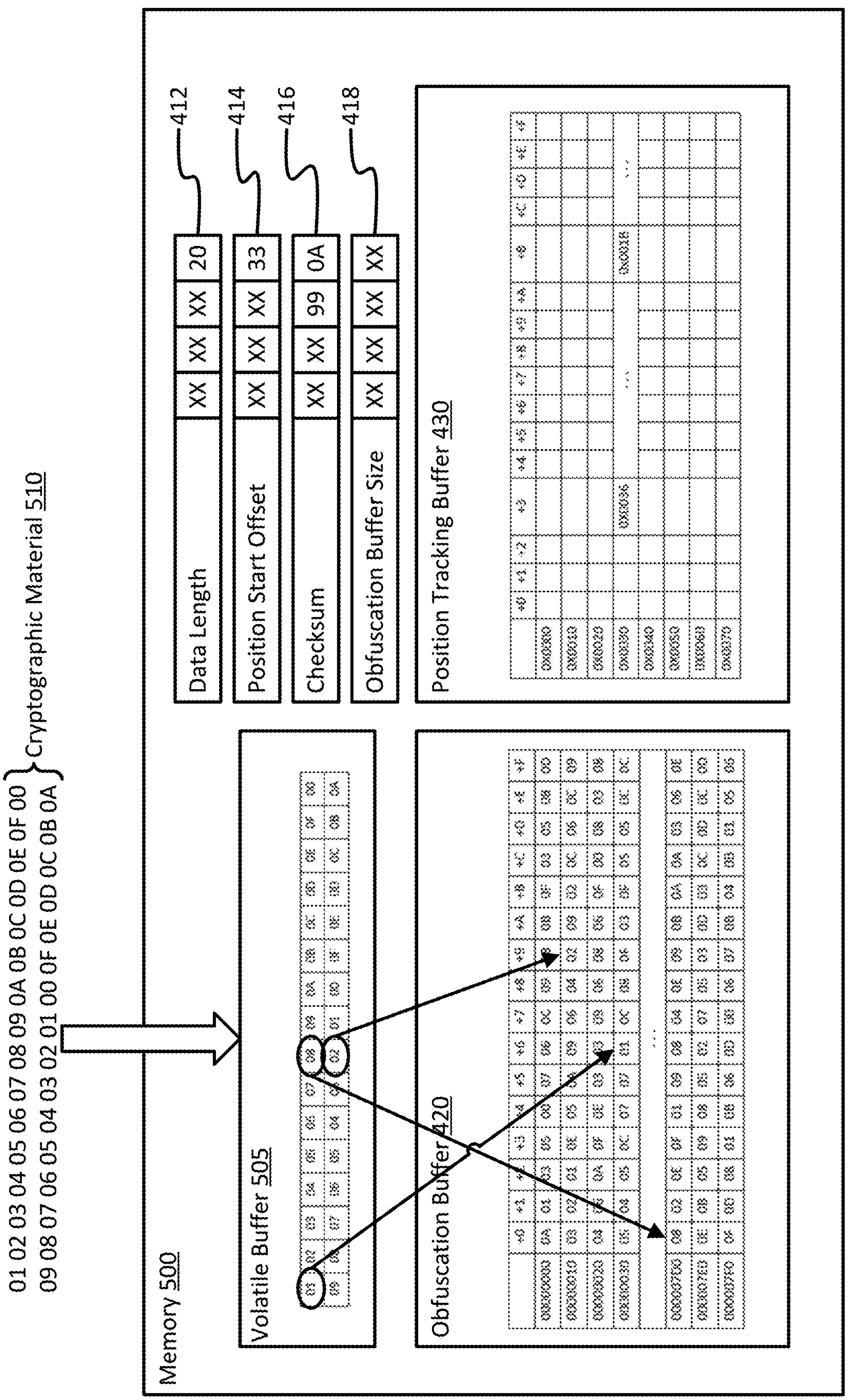
FIG. 5 shows an example of obfuscating cryptographic material in accordance with one or more aspects of the disclosure.

FIG. 5 shows an example of obfuscating data (e.g., plaintext cryptographic material) in accordance with one or more aspects of the disclosure. FIG. 5 comprises a memory 500 comprising a volatile buffer 505. The memory may receive plaintext cryptographic material 510, which is stored in volatile buffer 505. In the example shown in FIG. 5, plaintext cryptographic material 510 may be an encryption key. It will be understood that plaintext cryptographic material 510 may comprise a password, a signature key, authentication information, or the like.

Upon receipt of the cryptographic material 510, memory 500, or an application executing via a processor (not shown) on memory 500, may allocate a block of memory for storing the cryptographic material 510. The block of memory may comprise a header (shown by first field 412, second field 414, third field 416, and fourth field 418), an obfuscation buffer 420, and a position tracking buffer 430. In the example shown in FIG. 5, obfuscation buffer 420 may be 2048-bytes and position tracking buffer may comprise a 128-number array. Including the 16-byte header, memory 500 may allocate blocks of memory for each of a plurality of cryptographic material. Each of the blocks of memory may be stored in a look-up table such that the data may be subsequently retrieved.

Memory 500 may initially store the size (e.g., length) of the cryptographic material 510 in first field 412. Additionally, memory 500 may randomly determine a position start offset value and store the position start offset value in second field 414. As shown in FIG. 5, the position start offset value may be 51, or 0x33 in hexadecimal representation. Memory 500 may further calculate (e.g., compute) a checksum of cryptographic material 510 and store the checksum in third field 416. Finally, the memory may store the size (e.g., length) of obfuscation buffer 420 in fourth field 418.

After storing metadata associated with cryptographic material 510, memory 500 may write first random data to obfuscation buffer 420 and second random data to position tracking buffer 430. In some instances, first random data and second random data may be different sets of data. For the first byte of cryptographic material 510 (e.g., "01," index number=0), memory 500 may randomly select (e.g., choose) an unused byte with which to write the first byte of cryptographic material 510. For example, the first, random unused byte may be 54 (represented in hexadecimal as 0x36). Accordingly, the first byte of cryptographic material 510 (e.g., "01") may be written to the location corresponding to 0x36 in obfuscation buffer 420. The location of the first byte of cryptographic material (e.g. "0x36") may be stored at a first address in position tracking buffer 430. The first address may be determined, for example, using the position start offset value and the index number corresponding to which byte of cryptographic material 510 is being written. This process may be repeated for each byte of cryptographic material 510. As noted above, once each byte of cryptographic material 510 has been written to obfuscation buffer 420, and each corresponding location stored in position tracking buffer 430, memory 500 may erase cryptographic material 510 from volatile buffer 505. In some examples, memory 500 may write random data to volatile buffer to overwrite previously stored cryptographic material 510. In this way, a malicious user (e.g., hacker) may be unable to recover cryptographic material from volatile buffer 505.

Figure 6:
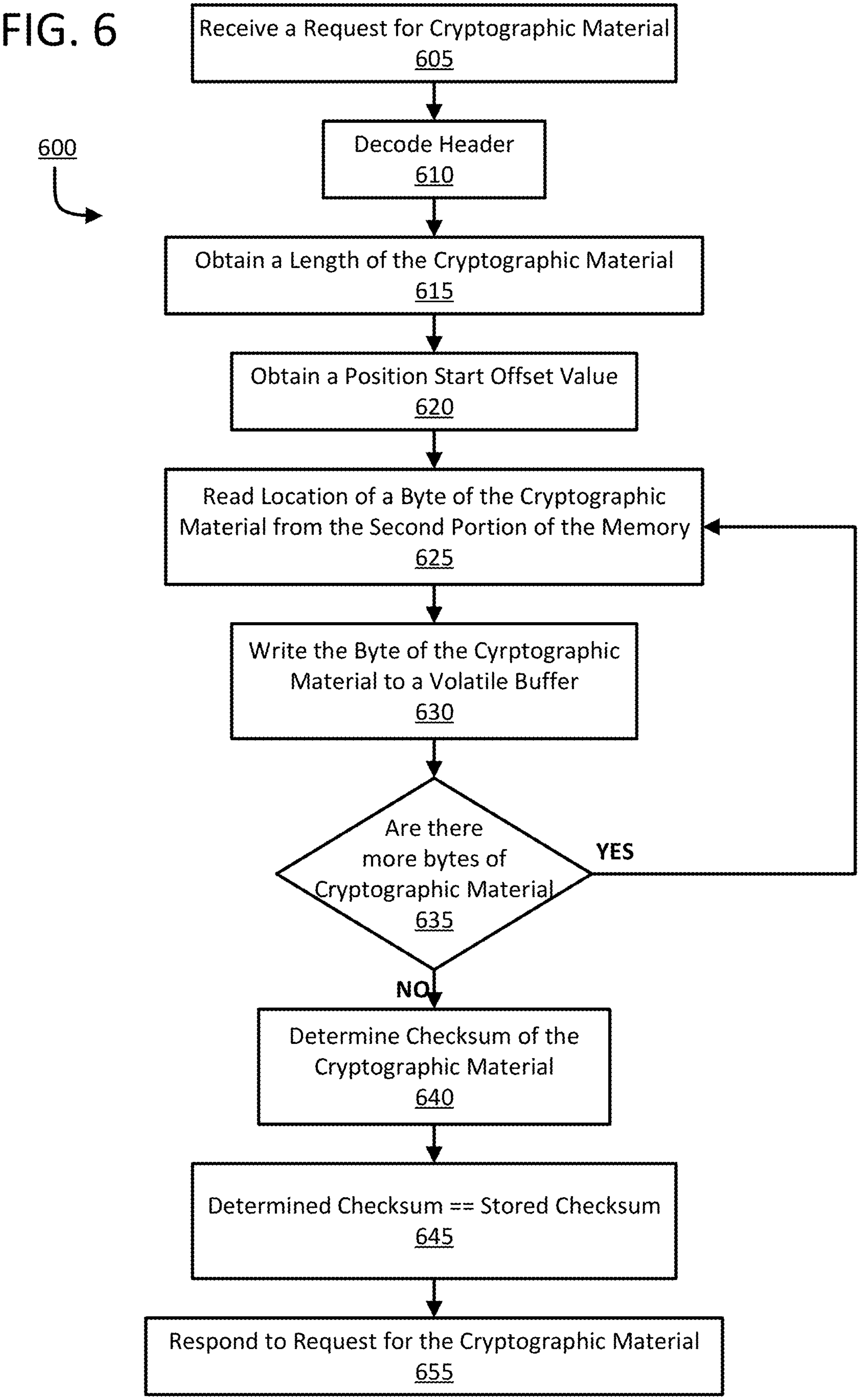
FIG. 6 shows an example of a process for recovering cryptographic material according to one or more aspects of the disclosure.

The obfuscated data (e.g., plaintext cryptographic material) may be requested, for example, by an application and/or device that would like to make use of the data. Accordingly, the memory may respond to the request for the data (e.g., plaintext cryptographic material) by recovering (de-obfuscating) the data from memory and providing it to the request application and/or device. FIG. 6 shows a flow chart of a process 600 for recovering (e.g., de-obfuscating) cryptographic material stored in a memory according to one or more aspects of the disclosure. Some or all of the steps of process 300 may be performed using one or more computing devices as described herein, including, for example, a client device, a server, or a memory comprising a processor configured to performed the methods described herein.

In step 605, a computing device (e.g., an application executing on the computing device) may receive a request for the data (e.g., plaintext cryptographic material) stored in a memory. In particular, the data may be stored in an obfuscation buffer of the memory. The request may be received from a computing device and/or an application executing on a computing device. In response to the request, the computing device (e.g., the application executing on the computing device) may query a look-up table to determine a block of memory associated with the request.

Once the block of memory is determined via the look-up table, the computing device may decode a header associated with the requested data in step 610. In step 615, the computing device may obtain the size (e.g., length) of the data from a first field of the header. In step 620, the computing device may obtain the position start offset value from the second field of the header. Using the position start offset value, the computing device may determine a location of a first byte of the data in the obfuscation buffer by reading an address of the location of the first byte of the data from the position tracking buffer, in step 625. As discussed above, the address of the location of the first byte of the data may be read from the position tracking buffer. In particular, the position tracking buffer may store the address of the first location at an address determined based on the position start offset value plus an index associated with the byte of the data (e.g. "0" for the first byte, "1" for the second byte, . . . "n−1" for the nth byte). In step 630, the computing device may write the byte of data from the obfuscation buffer to a volatile buffer. In step 635, the computing device may determine whether there are additional bytes of data to be recovered. If so, process 600 returns to step 625, where the computing device may determine a subsequent location for each byte of the data in the obfuscation buffer by reading a plurality of addresses from the position tracking buffer. Each byte of data may be written from the obfuscation buffer to the volatile buffer. Once every byte of the data is written to the volatile buffer, the computing device may determine a checksum of the data written to the volatile buffer in step 640. As noted above, the checksum may be determined using a CRC and/or hash calculation. In step 645, the computing device may compare the determined checksum to the checksum stored in the third field of the header. If the checksums do not match, the data may be discarded and process 600 may be repeated. However, when the checksums do match, the computing device may provide the data (e.g., plaintext cryptographic material) to the requester, in step 655. The requester may use the data (e.g., plaintext cryptographic material to perform one or more cryptographic operations.

Figure 7:
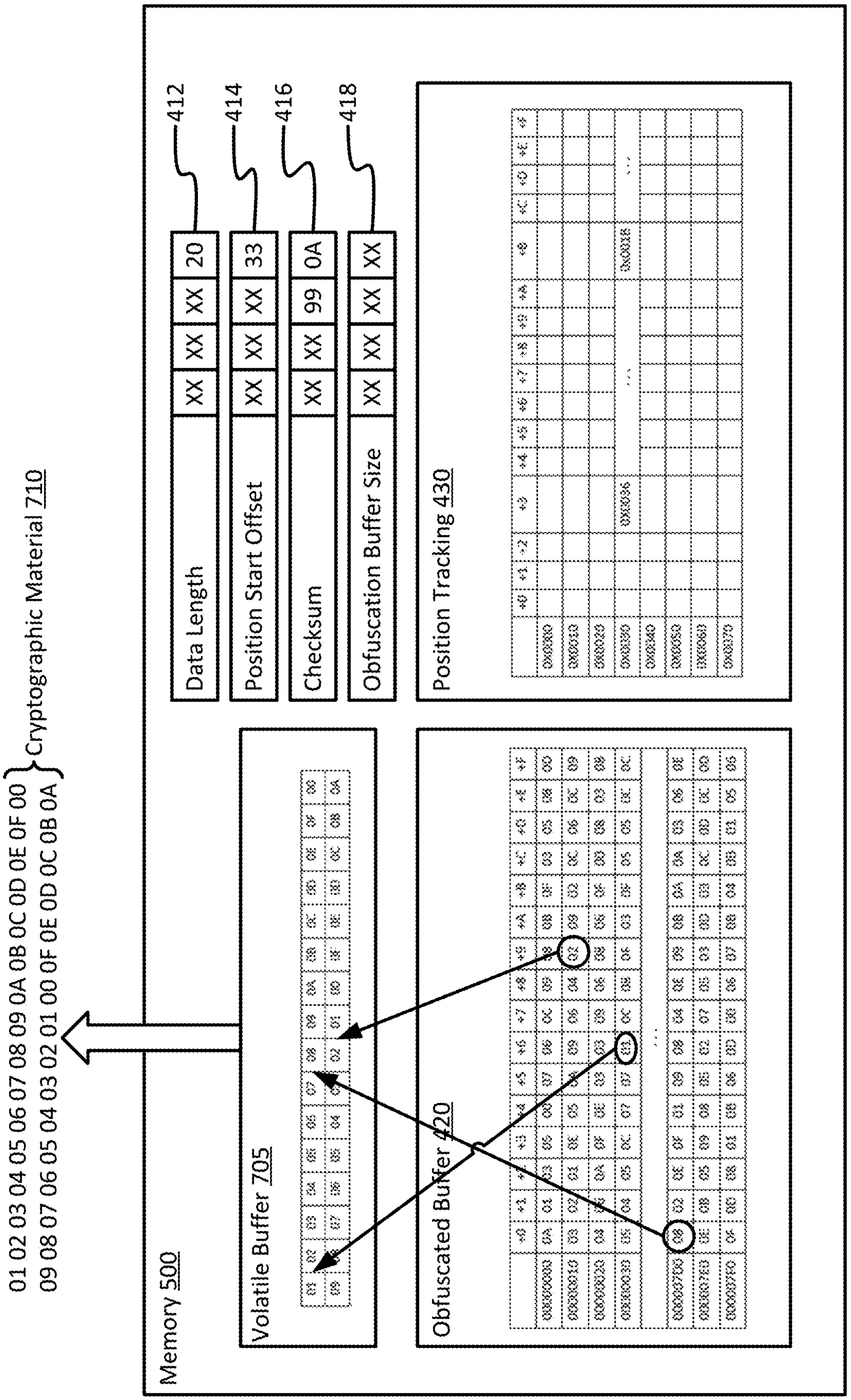
FIG. 7 shows an example of recovering cryptographic material in accordance with one or more aspects of the disclosure.

FIG. 7 shows an example of recovering cryptographic material in accordance with one or more aspects of the disclosure. FIG. 7 comprises memory 500 to further the example described in description of FIG. 5, above. Memory 500 may comprise at least one block of memory comprising the header (shown via first field 412, second field 414, third field 416, and fourth field 418), obfuscation buffer 420, and position tracking buffer 430.

Upon receipt of a request for the cryptographic material stored in obfuscation buffer, memory 500 may allocate volatile memory buffer 705. In this regard, volatile memory buffer 705 may be a temporary buffer configured to store the plaintext cryptographic material. Next, the memory 500 may determine the size (e.g., length) of the cryptographic material, for example, by reading the size of the plaintext cryptographic material from the first field 412. After the size of the cryptographic material is determined, the memory 500 may determine where the location of the first byte of cryptographic material is stored. The location of the first byte of cryptographic material may be determined by obtaining the position start offset value from second field 414 and combining the position start offset value with an index value associated with the byte of data. For example, the first byte of the cryptographic material would be stored at the position start offset value because the index of the first byte of cryptographic material would be zero ("0"). The first byte of cryptographic material may be read from obfuscation buffer 420 and written to volatile buffer 705. The process may be repeated for each subsequent byte of the cryptographic material. After each byte of the cryptographic material is written to the obfuscation buffer, a checksum of the cryptographic material may be calculated. The calculated checksum may then be compared to the checksum stored in third field 416. When the checksums match, memory 500 may provide cryptographic material 710, for example, based on or in response to the request for the cryptographic material.

The above-described systems, devices, and methods may improve the security of plaintext data stored in a memory. In particular, the techniques described herein may prevent the recovery of data via scanning memory dumps, scanning core dump files, cold boot attacks, and the like. These techniques can be accomplished without adding significant delay when data is requested.

One or more features discussed herein may be embodied in computer-usable or readable data and/or computer-executable instructions, such as in one or more program modules, executed by one or more computers or other devices as described herein. Program modules may comprise routines, programs, objects, components, data structures, and the like. That perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. The functionality of the program modules may be combined or distributed as desired. In addition, the functionality may be embodied in whole or in part in firmware or hardware equivalents such as integrated circuits, field programmable gate arrays (FPGA), and the like. Particular data structures may be used to more effectively implement one or more features discussed herein, and such data structures are contemplated within the scope of computer executable instructions and computer-usable data described herein. Various features described herein may be embodied as a method, a computing device, a system, and/or a computer program product.

Although the present disclosure has been described in terms of various examples, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present disclosure may be practiced otherwise than specifically described without departing from the scope and spirit of the present disclosure. Although examples are described above, features and/or steps of those examples may be combined, divided, omitted, rearranged, revised, and/or augmented in any desired manner. Thus, the present disclosure should be considered in all respects as illustrative and not restrictive. Accordingly, the scope of the disclosure should be determined not by the examples, but by the appended claims and their equivalents.

The invention claimed is:

1. A computer-implemented method for obfuscating cryptographic material stored in a memory, the method comprising:

writing each byte of the cryptographic material to a different location in an obfuscation buffer, wherein each different location is based on a random offset value determined for each byte of the cryptographic material;

storing, in a position tracking buffer based on a position start offset value, a first address of a first byte of the cryptographic material written to the obfuscation buffer, wherein the first address indicates a location of the first byte in the obfuscation buffer; and storing, in the position tracking buffer based on the position start offset value plus an index associated with each byte of the cryptographic material written to the obfuscation buffer, a subsequent address of each subsequent byte of the cryptographic material written to the obfuscation buffer.

2. The computer-implemented method of claim 1, wherein the cryptographic material comprises at least one of a password, an encryption key, authentication information, or a biometric identifier.

3. The computer-implemented method of claim 1, further comprising:

calculating a checksum of the cryptographic material; and storing the checksum in a field of a header.

4. The computer-implemented method of claim 1, wherein determining the random offset value for each byte of the cryptographic material to be written to the obfuscation buffer further comprises:

determining whether the random offset value has been used for a byte of the cryptographic material previously; and determining, based on a determination that the random offset value has been used for a byte of the cryptographic material previously, a different random offset value.

5. The computer-implemented method of claim 1, wherein determining the position start offset value comprises:

determining whether the position start offset value has been used for second cryptographic material currently stored in the obfuscation buffer; and determining, based on a determination that the position start offset value has been used for second cryptographic material currently stored in the obfuscation buffer, a different position start offset value.

6. The computer-implemented method of claim 1, further comprising:

storing the position start offset value in a field of a header.

7. The computer-implemented method of claim 1, further comprising:

before writing each byte of the cryptographic material to the obfuscation buffer, writing first random data to the obfuscation buffer, wherein the first random data is generated by a pseudorandom number generator; and writing second random data to the position tracking buffer.

8. The computer-implemented method of claim 1, further comprising:

storing the cryptographic material in a volatile buffer while the cryptographic material is being written to the obfuscation buffer; and writing, based on a determination that each byte of the cryptographic material has been written to the obfuscation buffer, random data to the volatile buffer to render the cryptographic material unrecoverable.

9. The computer-implemented method of claim 1, further comprising:

based on determining the position start offset value, writing the position start offset value to a header; and encoding, based on writing information to the header, the header to obfuscate the information.

10. The computer-implemented method of claim 1, further comprising:

determining a length of time that the cryptographic material has been stored in the obfuscation buffer;

based on determining that the length of time exceeds a predetermined threshold, erasing the cryptographic material; and based on erasing the cryptographic material, writing first random data to the obfuscation buffer, wherein the first random data is generated by a pseudorandom number generator.

11. A computer-implemented method for de-obfuscating cryptographic material stored in a memory, the method comprising:

receiving a request for cryptographic material stored in an obfuscation buffer of the memory;

determining a location of each byte of the cryptographic material in the obfuscation buffer by reading, from a position tracking buffer based on a position start offset value, an address indicating the location of each byte of the cryptographic material in the obfuscation buffer;

writing each byte of the cryptographic material from the obfuscation buffer to a volatile buffer; and providing, based on verification of the cryptographic material in the volatile buffer and in response to the request for the cryptographic material, the cryptographic material.

12. The computer-implemented method of claim 11, further comprising:

decoding, prior to determining the location of each byte of the cryptographic material in the obfuscation buffer, a header associated with the memory; and determining the address of a first location of a first byte of the cryptographic material in the position tracking buffer by obtaining the position start offset value from a field of the decoded header.

13. The computer-implemented method of claim 11, further comprising:

decoding, prior to determining the location of each byte of the cryptographic material in the obfuscation buffer, a header;

obtaining a length of the cryptographic material from a field of the decoded header;

determining, based on the length of the cryptographic material, that additional bytes of the cryptographic material are stored in the obfuscation buffer;

determining a next location of a next byte of the cryptographic material in the obfuscation buffer; and retrieving the next byte of the cryptographic material from the obfuscation buffer.

14. A computing device comprising:

one or more processors; and memory storing instructions, that when executed by the one or more processors, cause the computing device to:

write each byte of cryptographic material to a different location in an obfuscation buffer, wherein each location is based on a random offset value determined for each byte of cryptographic material;

store, in a position tracking buffer based on a position start offset value, a first address of a first byte of cryptographic material written to the obfuscation buffer, wherein the first address indicates a location of the first byte in the obfuscation buffer; and store, in the position tracking buffer based on the position start offset value plus an index associated with each byte of the cryptographic material written to the obfuscation buffer, a subsequent address of each subsequent byte of cryptographic material written to the obfuscation buffer.

15. The computing device of claim 14, wherein the instructions, when executed by the one or more processors, cause the computing device to:

store the cryptographic material in a volatile buffer while the cryptographic material is being written to the obfuscation buffer; and write, based on a determination that each byte of the cryptographic material has been written to the obfuscation buffer, random data to the volatile buffer to render the cryptographic material unrecoverable.

16. The computing device of claim 14, wherein the instructions, when executed by the one or more processors, further cause the computing device to:

determine whether the random offset value has been used for a byte of the cryptographic material previously; and determine, based on a determination that the first random offset value has been used for a byte of the cryptographic material previously, a different random offset value.

17. The computing device of claim 14, wherein the instructions, when executed by the one or more processors, further cause the computing device to:

determine whether the position start offset value has been used for second cryptographic material currently stored in the obfuscation buffer; and determine, based on a determination that the position start offset value has been used for second cryptographic material currently stored in the obfuscation buffer, a different position start offset value.

18. The computing device of claim 14, wherein the instructions, when executed by the one or more processors, further cause the computing device to:

before writing each byte of the cryptographic material to the obfuscation buffer, write first random data to the obfuscation buffer, wherein the first random data is generated by a pseudorandom number generator; and write second random data to the position tracking buffer.

19. The computing device of claim 14, wherein the instructions, when executed by the one or more processors, further cause the computing device to:

based on determining the position start offset value, write the position start offset value to a header; and encode, based on writing information to the header, the header to obfuscate the information.

20. The computing device of claim 14, wherein the instructions, when executed by the one or more processors, further cause the computing device to:

determine a length of time that the cryptographic material has been stored in the obfuscation buffer;

based on determining that the length of time exceeds a predetermined threshold, erase the cryptographic material; and based on erasing the cryptographic material, write first random data to the obfuscation buffer, wherein the first random data is generated by a pseudorandom number generator.

* * * * *